March 5, 1935. M. NYSTROM 1,993,073

PHONOGRAPH

Filed July 21, 1930 9 Sheets-Sheet 1

Inventor
Martin Nystrom
By Churchill Parker Carlson
Attys.

March 5, 1935. M. NYSTROM 1,993,073
PHONOGRAPH
Filed July 21, 1930 9 Sheets-Sheet 2

Inventor
Martin Nystrom

March 5, 1935.  M. NYSTROM  1,993,073
PHONOGRAPH
Filed July 21, 1930  9 Sheets-Sheet 4

Inventor
Martin Nystrom

March 5, 1935.  M. NYSTROM  1,993,073
PHONOGRAPH
Filed July 21, 1930  9 Sheets-Sheet 5

Inventor
Martin Nystrom
By Chusdell Parker Carlson
Attys.

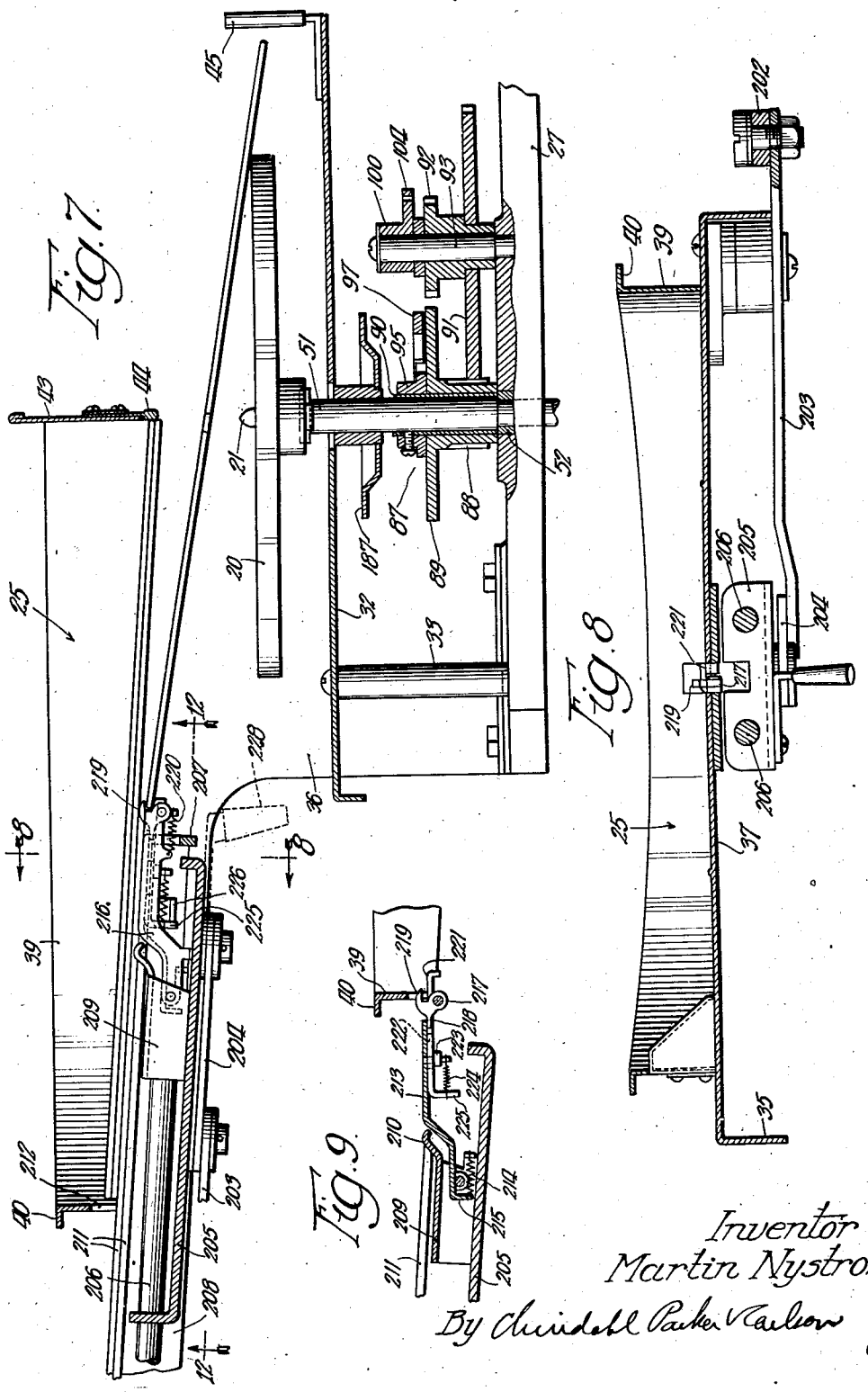

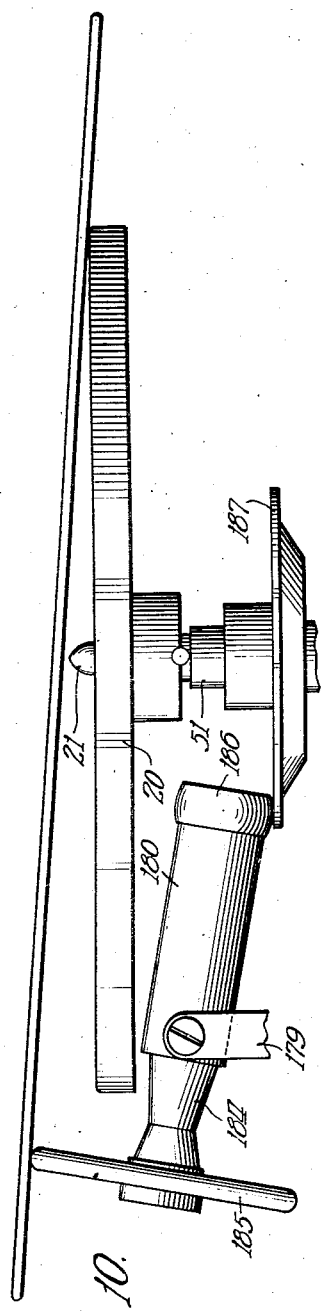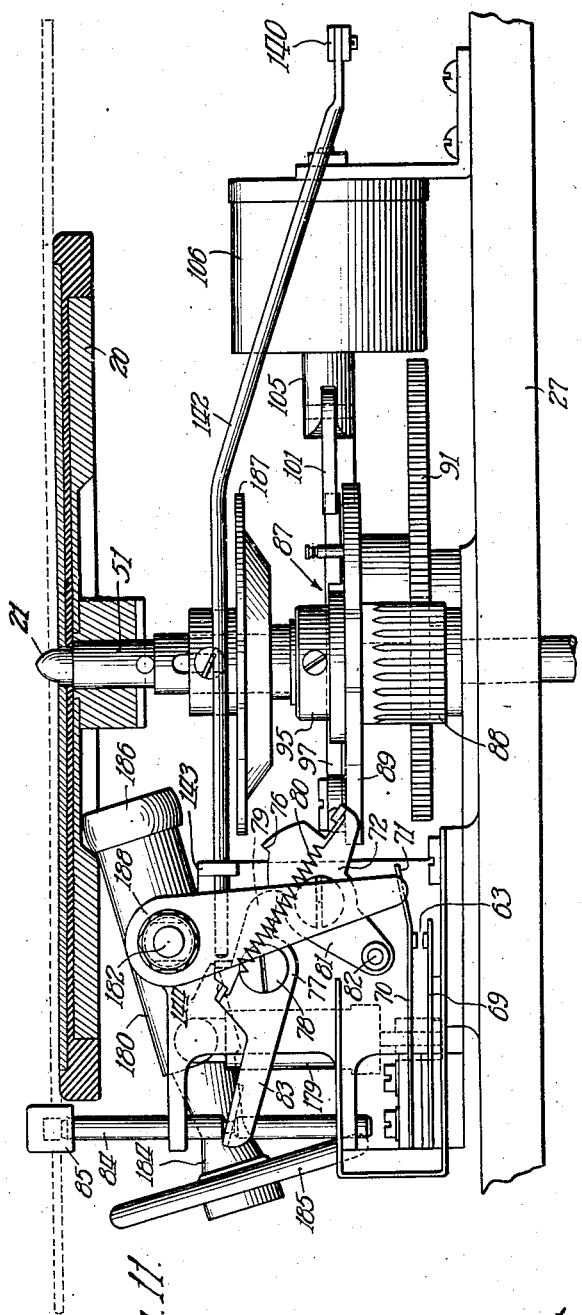

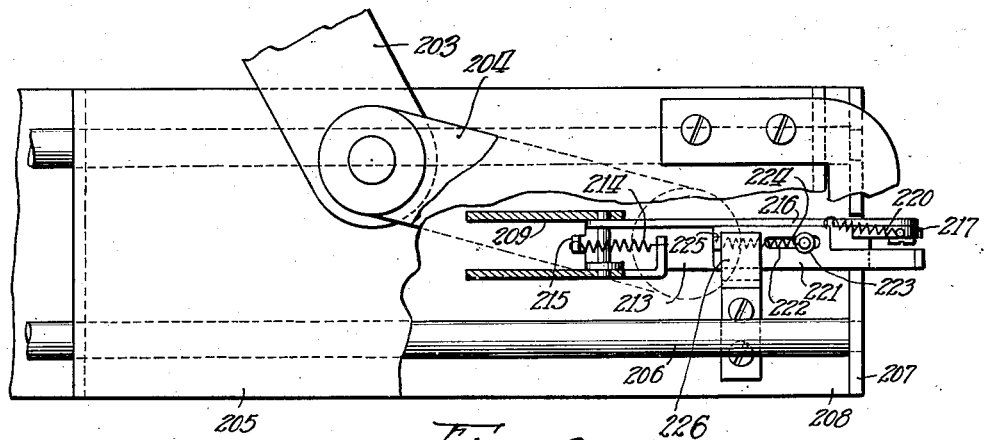
Fig. 12.
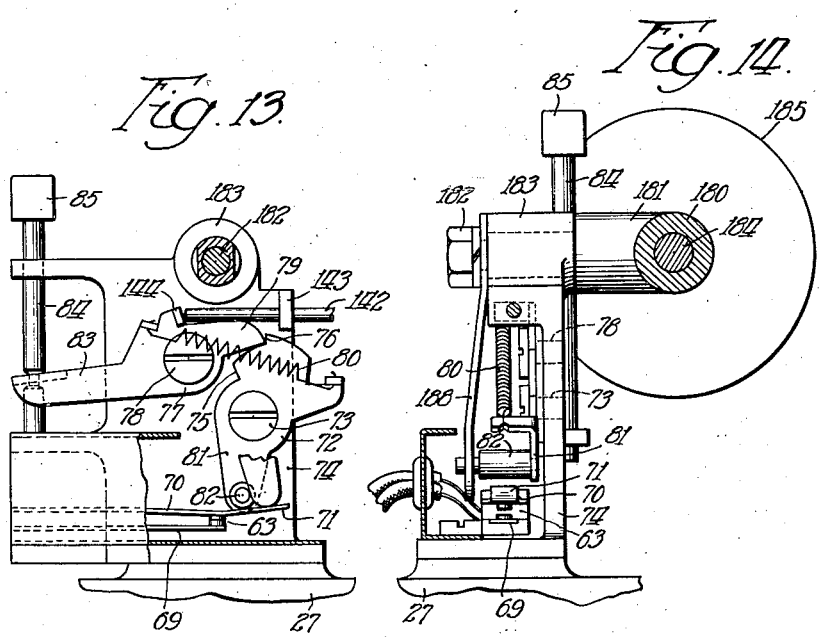
Fig. 13.
Fig. 14.
Inventor
Martin Nystrom

March 5, 1935.  M. NYSTROM  1,993,073

PHONOGRAPH

Filed July 21, 1930   9 Sheets-Sheet 9

Inventor
Martin Nystrom
By Arundell Parker Carlson
Attys.

Patented Mar. 5, 1935

1,993,073

UNITED STATES PATENT OFFICE 1,993,073

PHONOGRAPH

Martin Nystrom, Chicago, Ill., assignor to United Research Corporation, Long Island City, N. Y., a corporation of Delaware Application July 21, 1930, Serial No. 469,488

43 Claims. (Cl. 274—10)

The present invention relates generally to improvements in phonographs, and more particularly to phonographs capable of automatically playing a plurality of disk records in succession.

In automatic phonographs, the records are transferred successively from a suitable supply onto a rotatable support. With a record in playing position on the rotatable support, a stylus, which is carried by a pickup pivotally mounted on the free end of a swinging arm, is caused to travel from an initial starting point through the extent of the record groove. Thereupon, the stylus is raised to clear the record, and the latter is discharged from the support. Another record now is transferred to the support, and the stylus is returned to the initial starting point.

Various objects of the present invention reside in the provision of novel means operable in timed relation for transferring records one at a time to the rotatable support, for swinging and positioning the arm supporting the pickup, for raising and lowering the pickup, and for discharging the records from the support.

Another object is to provide a new and improved automatic phonograph in which a single drive means is provided for actuating the record changing mechanism, namely the transferring means, the swinging arm, the pickup and the discharge means, and in which this drive means is adapted to be connected periodically to a primary power drive through a clutch adapted to be closed through the action of a solenoid subject to excitation at will or automatically when the stylus has traveled the full extent of the record groove.

A further object resides in the provision of a novel switch for controlling the excitation of the solenoid, which is responsive to the movements of the swinging arm, and more particularly will be closed automatically upon movement of the arm either inwardly toward the center of the record beyond a predetermined position, or outwardly.

Another object is to provide novel means for locking the clutch in the drive means for the record changing mechanism in closed position after institution of the operation by the solenoid until the operation is completed.

Further objects reside in the provision of a control circuit for the power drive for the rotatable record support and the record changing mechanism, of a main switch which is automatically closed when a record is positioned on the support, and a supplemental switch in parallel with the main switch which is automatically closed during the record changing operation.

Still another object is to provide a single novel hand actuator for closing the main switch in the control circuit for the power drive, and simultaneously closing a switch in parallel with the switch controlled by the swinging arm to institute the operation of the phonograph when no record is positioned on the rotatable record support, or to reject a record in the course of being played.

A further object resides in the provision with a record magazine of new and improved feeding means for transferring records selectively from the magazine into position for release onto the rotatable record support, said means comprising a yieldable detent underlying the selected record during the feeding movement, and means for retracting the detent at the end of the feeding movement.

Another object resides in the provision of novel means for guiding the selected record from the feeding means centrally onto the rotatable support.

A further object resides in the provision of new and improved means for ejecting the record from the rotatable support, said means comprising a friction element for lifting one edge of the record from the support and tending to impart a force thereto opposite to the rotative force applied by the support, thereby producing a resultant force for discharging the record from the support accurately and expeditiously.

Another object resides generally in the provision of a new and improved phonograph comprising a frame, a rotatable record support on the frame, a record magazine mounted on the frame above and partially offset with respect to the support, and a discharge receptacle at one side of the support and directly beneath the record magazine.

A general object is to provide a novel automatic phonograph which is certain, accurate and expeditious in operation, and which is simple, compact and inexpensive in construction.

Further objects and advantages will become apparent as the description proceeds.

In the accompanying drawings, Figure 1 is a plan view of a phonograph embodying the features of my invention.

Figure 4:
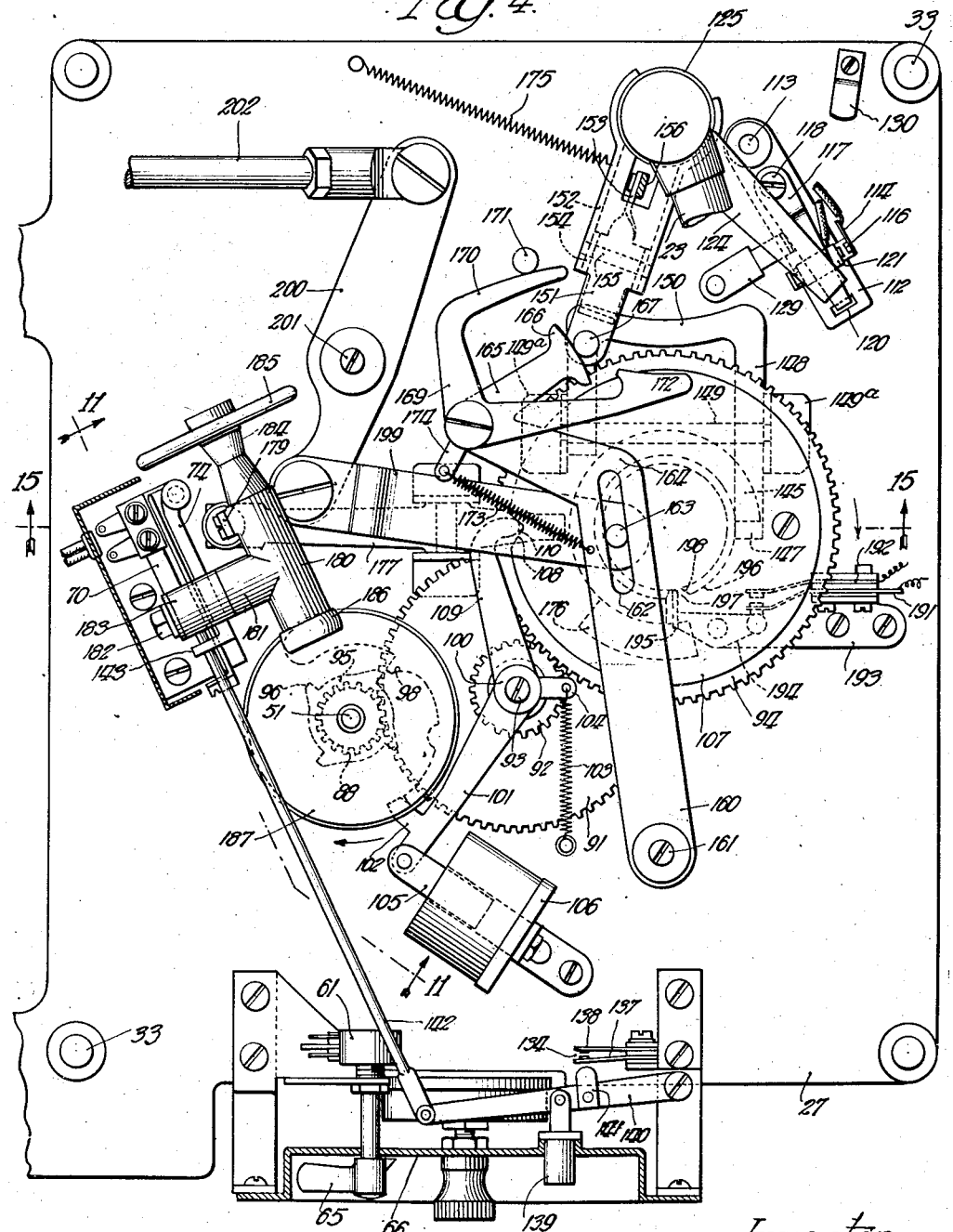
Fig. 4 is a fragmentary horizontal sectional view on an enlarged scale taken along line 4—4 of Fig. 2, and showing the record changing mechanism in idle position.

Fig. 5 is a fragmentary view similar to Fig. 4, but showing the record changing mechanism in operation.

Fig. 6 is a fragmentary detail view of the automatic switch for instituting operation of the record changing mechanism taken substantially along line 6—6 of Fig. 5.

Figure 1:
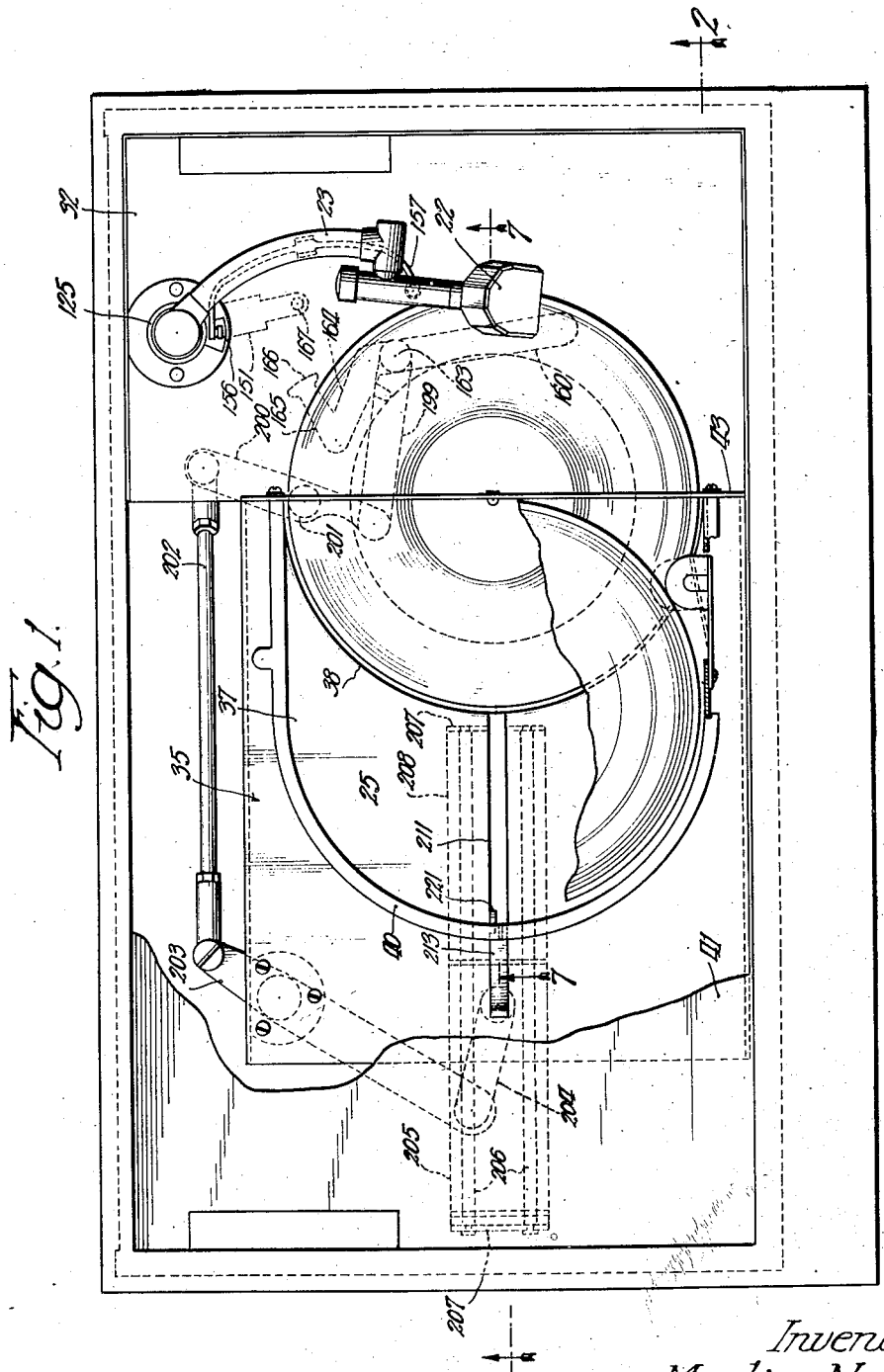

Fig. 7 is a vertical sectional view taken substantially along line 7—7 of Fig. 1.

Fig. 8 is a fragmentary sectional view of the record magazine and the record feeding means taken along line 8—8 of Fig. 7.

Fig. 9 is a fragmentary vertical sectional view of the record feeding means.

Fig. 10 is a fragmentary side elevational view of the record ejecting means, showing the record about to be discharged.

Fig. 11 is a vertical sectional view taken substantially along the line 11—11 of Fig. 4, and showing the record ejecting means in idle position.

Fig. 12 is a fragmentary plan view of the record feeding means, partially in section along line 12—12 of Fig. 7.

Fig. 13 is a fragmentary elevational view of the motor control switch.

Fig. 14 is an end elevational view of the switch shown in Fig. 13.

Figure 15:
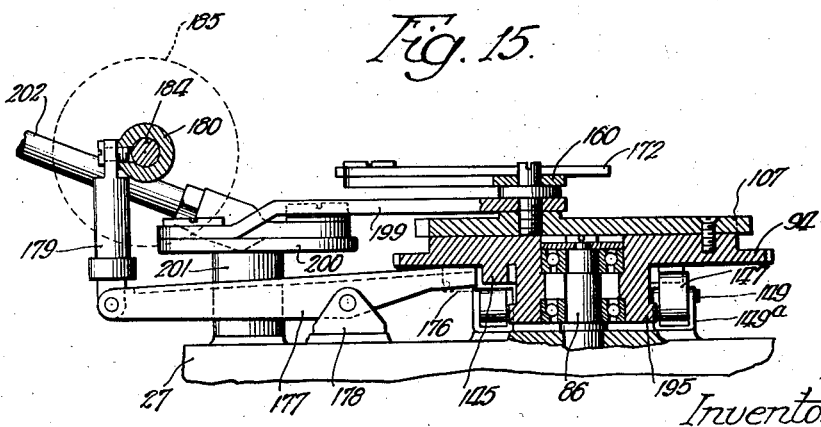

Fig. 15 is a vertical sectional view taken along line 15—15 of Fig. 4.

Figure 16:
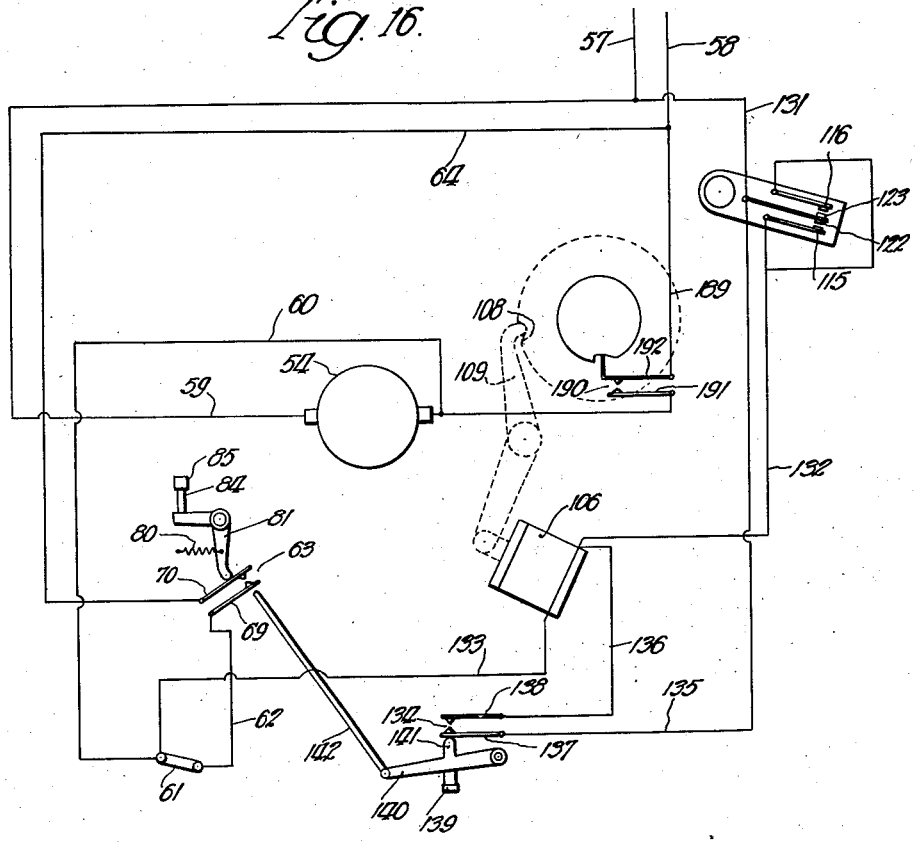

Fig. 16 is a diagrammatic representation of the control circuits.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the phonograph constituting the exemplary embodiment of the invention is of the type in which a plurality of records are played automatically in sequence. The phonograph in general comprises a suitable horizontal rotatable support or turn table 20 with an upstanding axial centering pin 21, and an electrical pickup 22 pivotally mounted for vertical movement on the free end of a horizontally swinging arm 23 designated for convenience as a tone arm. A suitable stylus 24 is removably inserted in the pickup 22.

The records to be played are stacked in a magazine 25 from where they are transferred singly onto the turn table 20. With a record in position, the tone arm 23 is swung over the record, and then the pickup 22 is lowered to bring the stylus 24 into engagement with the record groove at the starting point adjacent the outer periphery. The tone arm permits the stylus 24 to travel inwardly along the record groove to play the record, and then into a concentric groove located at a fixed distance from the center of the record. Thereupon, the pickup 22 is elevated, and the tone arm 23 is swung outwardly beyond the turn table to clear the record. The played record is discharged onto a shelf 26 and a new record from the magazine 25 is positioned on the turn table.

The operating mechanism of the phonograph is mounted on a suitable frame which preferably comprises a horizontal frame plate 27. This plate may be supported in any suitable enclosure, and in the present instance is rigidly mounted on two spaced supports 28 and 29 which are secured respectively to one outside wall 30 and an intermediate wall 31 of a cabinet. A cover plate 32 is secured in parallel spaced relation over the plate 27 and closely under the turn table 20 by means of suitable spacers 33 and bolts 34, and has one edge resting on the top of the intermediate wall 31.

Preferably, the magazine 25 comprises a frame 35 having side legs 36 rigidly mounted on one side of the plate 27, and having a record supporting wall 37 bridging the upper ends of the legs and extending from beyond the intermediate wall 31 directly over the turntable 20 approximately to the center, and slightly inclined downwardly toward the turntable. The wall 37 comprises the floor of the record compartment, and is formed in its lower edge with a semi-circular flanged opening 38 having a radius slightly larger than that of the records. The opening 38 is located directly over and concentric with the turntable 20 so that when the lowermost record of a stack is moved into registration therewith, it will be permitted to drop with its central aperture substantially in alignment with the centering pin 21.

Mounted on the floor 37 is an upstanding record confining wall 39 having an outer peripheral flange 40 on its upper end. Preferably, the wall 39 is U-shaped, with the curved portion conforming to the curvature of the records, and with the legs extending along opposite sides of the opening 38. A board 41 forming part of the cabinet rests on the flange 40 and is formed with an opening 42 conforming to the wall 39.

A straight vertical guide wall 43 extends across the ends of the wall 39 and diametrically of the opening 38 and turntable 20. The lower edge of the wall 43 is spaced above the floor 37 by the thickness of one record. Adjustably mounted on the lower edge of the wall 43 intermediate its ends is a retarding friction pad 44 for engaging the top of each record as it is moved underneath into position over the turntable 20. The walls 39 and 43 constitute the side walls of the magazine, and define a compartment just sufficient in lateral area to receive the records. The compartment is sufficiently deep to receive a stack of records.

Suitable guides 45 are mounted in peripherally spaced relation about the turntable 20 to direct the record from the opening 38 substantially centrally onto the turntable. Two of these guides are mounted on opposite ends of the wall 43 and depend below the turntable. A third guide is mounted on the cover plate 32 in an intermediate position and extends above the turntable 20. The centering pin 21 serves to locate the record accurately on the turntable.

Figure 2:
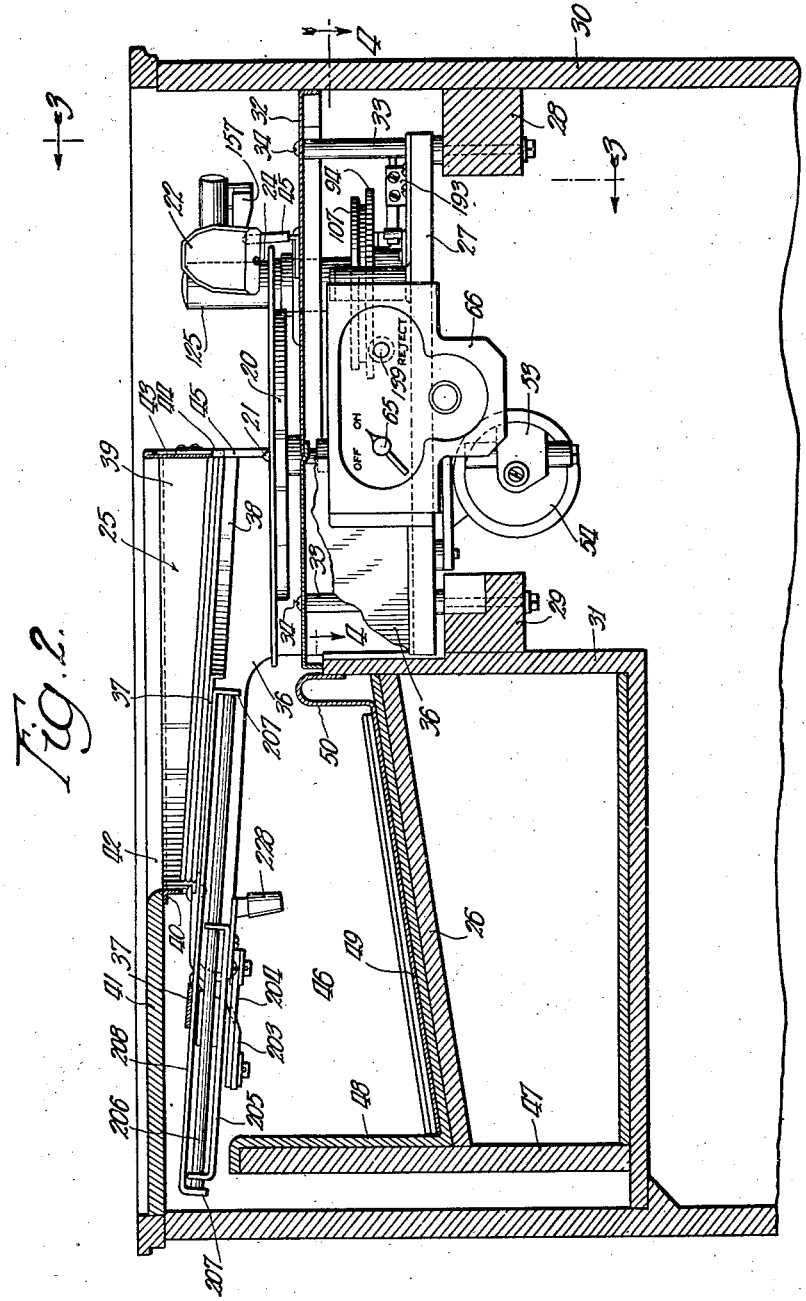
Fig. 2 is a vertical sectional view taken along line 2—2 of Fig. 1.

The shelf 26 forms the floor of a discharge receptacle 46 (see Fig. 2) preferably built into the cabinet. In the present instance, the shelf 26 is secured between the intermediate wall 31 and an opposed wall 47, and is slightly inclined upwardly toward the turntable 20. The walls of the discharge receptacle 46 are lined with a suitable flexible pad 48. A celluloid strip 49 is positioned on the pad 48 on the shelf 26, and its end adjacent the intermediate wall is turned up and then over to provide a guide 50 for the record as it is discharged from the turntable into the receptacle 46.

Figure 3:
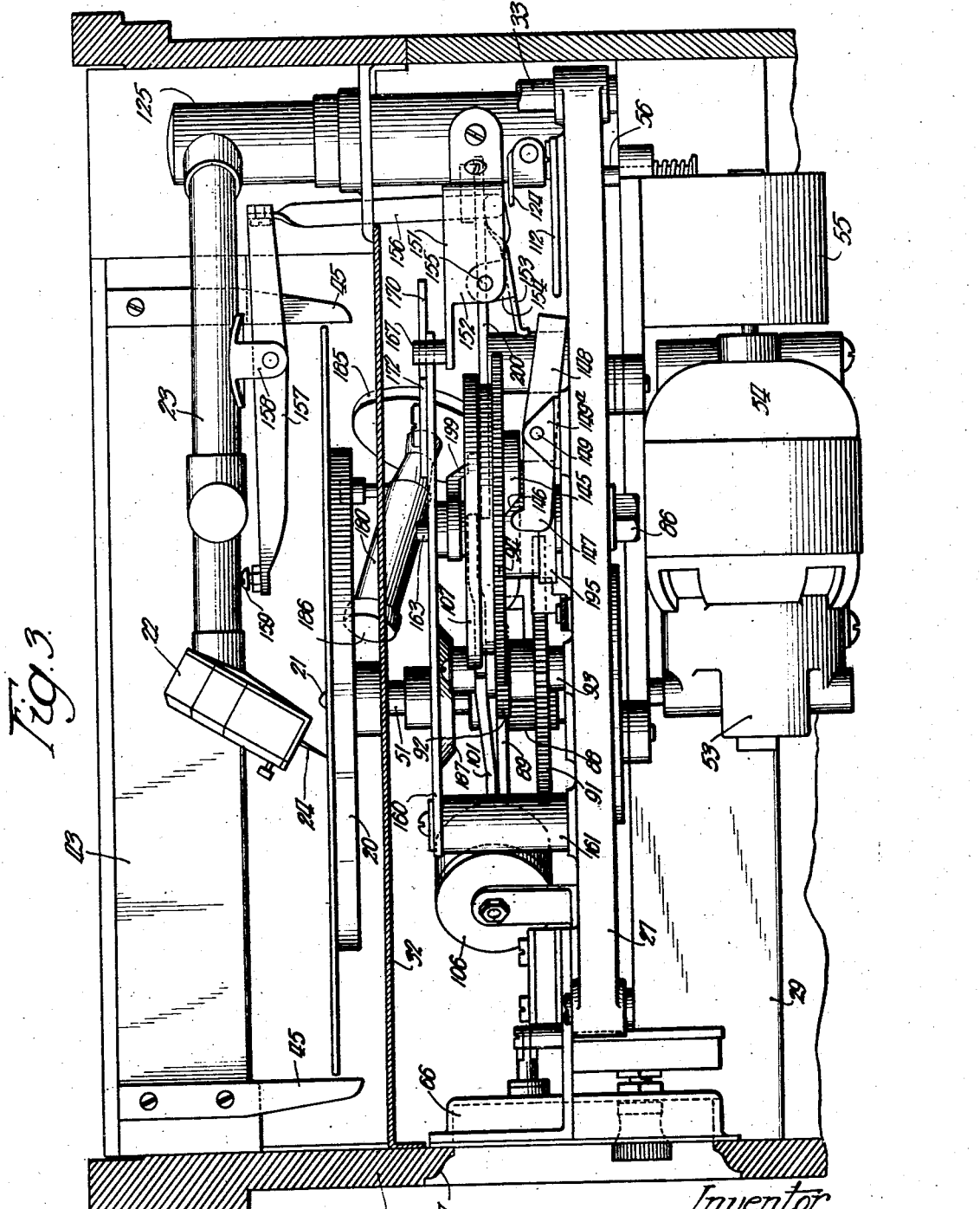
Fig. 3 is a vertical sectional view on an enlarged scale taken substantially along line 3—3 of Fig. 2.

Referring now to the operating mechanism, the turntable 20 is mounted on the upper end of a vertical drive spindle 51 (see Figs. 2, 3 and 7) which is journaled in and supported by a bushing 52 in the frame plate 27. The lower end of the spindle 51 is connected through a reduction gearing 53 to an electric motor 54 mounted on the underside of the frame plate 27. A speed governor 55 for the motor 54 is also mounted on the underside of the plate 27, and is subject to adjustment by means of a suitable hand control 56.

The motor 54 is adapted to be connected across two main line terminals 57 and 58 of a suitable source of current, (see Fig. 16) the circuit leading from the terminal 57 through a line 59, the motor 54, a line 60, a hand switch 61, a line 62, a switch 63 and a line 64 to the terminal 58. Both switches 61 and 63 are mounted on and suitably insulated from the frame plate 27. The switch 61 may be of any suitable type, and is provided with a hand actuator 65 (see Figs. 2 and 4) extending to the front of a control panel 66 which is secured to the front end of the plate 27, and which is located across a suitable opening 67 formed in the front wall 68 of the cabinet.

The switch 63 is adapted to be closed automatically when a record is positioned on the turntable 20. Preferably, the contacts of the switch 63 are mounted in opposed relation on two parallel, vertically spaced spring arms 69 and 70 (see Figs. 4, 11, 13 and 14). The free end of the upper arm 70 extends substantially beyond the contacts, and is inclined upwardly as indicated at 71.

The means for closing the switch 63 preferably comprises a lever 72 which is pivotally mounted on a stud 73 on a bracket 74 on the frame plate 27, and which is formed with two notches 75 and 76 spaced at different distances from the stud. A second lever 77 is pivotally mounted on a stud 78 on the bracket 74, and has a pawl arm 79 for engaging selectively in either of the notches 75 and 76. A coiled tension spring 80 is connected at its ends to the levers 72 and 77, and tends to rotate the latter in opposite directions and therethrough to hold the pawl arm 79 yieldingly in engagement in either of the notches 75 and 76. The lever 72 is formed with a depending arm 81 carrying a pin 82 which is held out of engagement with the upper spring arm 70 when the arm 79 engages in the notch 75, and which is movable into engagement with the toe 71 of the spring arm 70 to close the switch 63 when the arm 79 is moved out of engagement with the notch 75 into position for engagement in the notch 76.

The lever 77 is formed with a lateral trip arm 83 operatively connected to a vertical plunger 84 which is longitudinally reciprocable in the bracket 74 and which has a head 85 on its upper end normally in elevated position beside the turntable 20 for engagement by the record. It will be evident that when a record is positioned on the turntable 20, the plunger 84 will be depressed, thereby tripping the arm 83 and permitting the spring 80 to oscillate the pin 82 into engagement with the spring arm 70 to close the switch 63.

Journaled in the frame plate 27 is a vertical stub shaft 86 which is adapted to be driven periodically to actuate the various means for elevating and lowering the pickup 22, swinging the tone arm 23, ejecting the played record, and transferring a new record from the magazine 25 onto the turntable 20, through one complete cycle once for each record.

The stub shaft 86 may be connected to any suitable source of power, and preferably is adapted to be connected through a suitable clutch 87 (see Figs. 3, 4, 5 and 7) to the drive spindle 51 for the turntable 20. To this end, a pinion 88 formed on its upper end with a circular clutch plate 89 is freely rotatable on a sleeve 90 on the spindle 51. The pinion 88 meshes with a gear 91 rigid with a concentric pinion 92 freely rotatable on a fixed stud 93 on the frame plate 27. The pinion 92 meshes with a large gear 94 keyed to the stub shaft 86.

A clutch element 95 having a plurality of peripherally spaced ratchet teeth 96 is rigidly secured to the spindle 51 directly over the clutch plate 89. Pivotally mounted at one end on the plate 89 for movement therewith is an arcuate clutch shoe 97 having a tooth 98 movable into and out of position for engagement by one of the teeth 96 to connect the drive to the pinion 88. A coiled tension spring 99 connected to the plate 89 and the free end of the shoe 97 tends to swing the latter inwardly to establish this connection.

Pivotally mounted intermediate its ends on the stud 93 is a lever 100 one arm 101 of which is formed with a lug or toe 102 movable into and out of the path of the free end of the clutch shoe 97. A coiled tension spring 103 anchored to the plate 27 and connected to a lug 104 on the lever 100 tends to move the toe 102 into the path of the shoe 97. The free end of the arm 101 is pivotally connected to an armature 105 reciprocable in a solenoid 106 mounted on the plate 27. It will be evident that upon excitation of the solenoid 106, the toe 102 will be withdrawn out of engagement with the shoe 97. Thereupon, the tooth 98 will be engaged by the clutch element 95, and the drive connection from the spindle 51 to the shaft 86 will be established.

Secured to the upper end of the stub shaft 86 for rotation therewith is a circular lock disk 107 having a notch 108 in its periphery. The lever 100 has a second arm 109 which is formed on its free end with a rounded toe 110 adapted to seat in the notch 108 when the stub shaft 86 is in idle position. Upon completing the drive connection to the shaft 86, the free end of the clutch shoe 97 will immediately pass the toe 102 thus rendering the latter ineffectual to open the clutch 87 for at least one revolution of the plate 89. In the rotation of the lock disk 107 during the first part of this interval the notch 108 immediately forces the toe 109 outwardly to lock the lever 100 in inoperative position so that even though the solenoid is deenergized, the stub shaft 86 will be driven through one complete revolution. At the end of the revolution, the toe 110 under the influence of the spring 103 will snap into the notch 108, thus swinging the toe 102 into position to open the clutch 87.

Excitation of the solenoid 106 is controlled by a switch 111 responsive to the swinging movement of the tone arm 23, and more specifically adapted to be closed automatically when the tone arm 23 reaches its innermost position after playing of the record. The switch 111 may be of any suitable form, and preferably is of such construction that it will be closed either through coaction with a limit stop or through a reverse movement of the tone arm 23 under the influence of an eccentric groove in the record.

In the present instance, the switch 111 (see Figs. 4, 5 and 6) comprises a base lever 112 resting on the frame plate 27, and pivotal at one end about a pin 113. Mounted on the free end of the lever 112 is a U-shaped clip 114 the side arms of which carry opposed switch contacts 115 and 116. A second lever 117 is mounted on the lever 112 for pivotal movement at one end about a pin 118 adjacent the pin 113. The free end of the lever 117 is struck upwardly, then horizontally and then downwardly to form a bridge 119, and extends into a slot 120 formed in the free end of the lever 112. The slot 120 is of sufficient width to permit a limited relative movement between the levers 112 and 117.

An inverted U-shaped clip 121 is secured to the underside of the lever 117, and is provided with contacts 122 and 123 on its depending legs for engagement respectively with the contacts 115 and 116. A lateral arm 124 is rigidly secured to a sleeve 125 to which the tone arm 23 is secured, and which is rotatably mounted on a vertical stud 126 on the frame plate 27. The free end of the arm 124 is struck down and formed with a notch 127 embracing the lever 117. Mounted on the lever 112 is an upstanding leaf spring 128, the free end of which is positioned for engagement by one side of the lever 117 upon movement of the latter by the arm 124 with the tone arm 23 inwardly to resist movement of the contact 122 into engagement with the contact 115.

A stop 129 adjustably mounted on the frame plate 27 is positioned to engage the lever 112 and thereby limit further movement of the latter with the tone arm 23 inwardly when the stylus 24 reaches the inner end of the record groove, thus causing the contacts 115 and 122 to close against the action of the spring 128. The lever 117 however is free to move in the opposite direction to close the contacts 116 and 123, this movement being instituted upon moving the tone arm 23 outwardly as for example through the action of an eccentric groove on the record after the record has been played. A fixed stop 130 on the frame plate 27 serves to limit the outward movement of the arm 112 and hence the switch mechanism.

The intermediate contacts 122 and 123 are connected through a common line 131 (see Fig. 16) to the terminal 57. The outer contacts 115 and 116 are connected in parallel to a common line 132 leading to one terminal of the solenoid 106. Thus, the switch 111 preferably is of the double pole type.

Assuming the switch 63 to be closed due to the presence of a record on the turntable 20, closing of the switch 111 in either direction will close the following circuit through the solenoid 106: from the terminal 57 through the line 131, the switch 111, the line 132, the solenoid 106, a line 133, the switch 61, the line 62, the switch 63 and the line 64 to the terminal 58. Excitation of the solenoid 106 will cause the clutch 87 to close, thereby instituting operation of the stub shaft 86 as heretofore described.

Suitable means is provided operable at will for closing a circuit for the solenoid 106 shunting the switch 111. This means is available to reject a record before it is played, or at any time during the playing, and also to institute the operation of the machine to play the first record of the stack, and preferably comprises a switch 134 (see Figs. 4 and 16) operable from the panel 66. Of the switch 134, one contact is connected through a line 135 directly to the line 131, and the other contact is connected through a line 136 to the line 132. The contacts preferably are mounted on two spring arms 137 and 138.

A suitable hand actuator preferably a rejector button 139 at the front of the panel 66, is provided for closing the switch 134. In the present instance, the button 139 is pivotally connected with a lever 140 pivoted at one end on the panel structure. A dog 141 on the lever 140 is movable therewith into engagement with one of the spring arms 137 to close the switch 134, the arms normally tending to open the switch.

The solenoid circuit includes the switch 63, and hence the switch 134 will be ineffective to close the circuit unless a record is in position on the turntable. Suitable means therefore is operatively connected to the button 139 for closing the switch 63 simultaneously with the switch 134 to institute operation of the machine with a stack of records in the magazine 25 and none on the turntable 20. This means preferably comprises a trip rod 142 of which one end is pivotally connected to the free end of the lever 140, and of which the other end is slidable in a lug 143 on the bracket 74 and positioned for movement into engagement with a shoulder 144 (see Fig. 13) on the lever 77 to swing the pawl arm 79 out of engagement with the notch 75, thereby releasing the lever 72 to close the switch 63.

The means for elevating and lowering the pickup 22 (see Figs. 3 and 4) comprises an arcuate cam 145 formed on the underside of the gear 94 and extending through substantially 270°. The lead end of the cam 145 is beveled as indicated at 146, and is adapted immediately upon rotation of the shaft 86 to ride over and depress the free end of an arm 147 formed integral with a lever 148. The latter preferably is U-shaped in form with the legs pivotal on a pin 149 supported in suitable brackets 149ᵃ on the frame plate 27, and with the connecting portion between the legs constituting a curved lifting bar 150.

Rigidly secured to the tone arm sleeve 125 is a lateral arm 151 having depending side flanges 152. A lever 153 is formed intermediate its ends with upwardly struck ears 154 which fit inside of the flanges 152 and are pivoted thereto by means of a pin 155. The lever 153 thus is movable with the tone arm 23, and one end thereof is located throughout its range of movement directly over the lifting bar 150 for engagement thereby. The other end of the lever 153 is connected through a vertical link 156 extending closely along the sleeve 125 to one end of a lever 157 pivotally mounted intermediate its ends in a bracket 158 on the underside of the tone arm 23.

The outer end of the lever 157 is provided with an adjustable rest 159 for elevating and supporting the pickup 22 while the cam 145 is in engagement with the arm 147. Upon movement of the cam 145 out of engagement with the arm 147 the pickup 22 is free to drop through its own weight to bring the stylus 24 into unrestrained engagement with the record groove.

To swing the tone arm 23 into and out of playing position with the pickup 22 elevated, a lever 160 is pivotally mounted at one end on an upstanding post 161 on the plate 27, and is formed intermediate its ends with an elongated longitudinal slot 162 in bearing engagement with an upstanding pin 163 mounted eccentrically on the disk 107. The free end of the lever 160 is formed with a laterally inclined extension 164. Formed integral with the end of the extension 164 is an angularly disposed arm 165 having an arcuate end face 166 movable upon oscillation of the lever 160 through rotation of the disk 107 into engagement with an upstanding pin 167 on the free end of the arm 151 to swing the tone arm 23 and the pickup 22 outwardly beyond the record.

Pivotally mounted on the free end of the extension 164 is a forked lever 169 one arm of which is formed with a cam extension 170 adapted to ride against a fixed pin 171 on the frame plate 27, and the other arm of which is formed with a hook 172 for engaging the pin 167. A coiled tension spring 173 connected at its ends to the lever 160 and a lug 174 on the lever 169 tends to hold the cam extension 164 yieldingly against the pin 171.

The parts are so formed and related that upon movement of the tone arm 23 outwardly beyond the record, the hook 172 will be moved into position to engage the pin 167, and that upon reversal of the lever 160 through the last half of the rotation of the disk 107, the hook 172 through engagement with the pin 167 will swing the tone arm 23 inwardly until the pickup 22 is located over the starting point of the record groove at which point the cam extension 170 will swing the hook 172 to release the pin 167. Thereupon, the stylus 24 will be free to travel inwardly along the record groove. Preferably, a tension spring 175 is provided tending to swing the tone arm 23 inwardly over the record.

Means is provided for ejecting the record from the turntable 20 onto the shelf 26 shortly after the pickup 22 has been elevated. This means (see Figs. 3, 4, 10, 11, 14 and 15) comprises a cam abutment 176 mounted on the underside of the gear 94 and outside of the cam 145. The cam abutment 176 is positioned to ride over and depress one end of a lever 177 pivotally mounted intermediate its ends in a bracket 178 on the frame plate 27. The other end of the lever 177 is pivotally connected through a vertical link 179 to a tubular sleeve 180. The latter is formed with a lateral extension 181 having a horizontal pivot stud 182 journaled in a bearing 183 on the bracket 74.

Journaled in the sleeve 180 is a shaft 184. A friction roller 185 is secured to the end of the shaft 184 adjacent the link 179, and is adapted to be elevated into engagement with the underside of the record to raise one edge of the latter sufficiently to bring the central aperture above the centering pin 21 as indicated in Fig. 10. Preferably, the roller 185 is located adjacent that side of the opening to the shelf 26 where the record is turning away from the opening. As a result, the turning force applied by the turntable 20 and the resisting frictional force applied by the roller 185 act on opposite sides of the record. The component of these forces serves to remove the record expeditiously from the turntable 20 and to discharge it directly and quickly to the shelf 26.

Preferably, means is provided for rotating the roller 185 in a direction opposite to that of the record at the point of contact. This means comprises a friction roller 186 on the end of the shaft 184 opposite the roller 185. A friction disk 187 is secured to the spindle 51 for the turntable 20 in position for engagement by the roller 186 when the roller 185 is elevated to engage the record.

Means, automatically operable when the roller 185 is elevated to discharge the record, is provided for opening the switch 63 in the motor circuit so as to stop the machine when the last record of the stack supplied to the magazine 25 has been played. This means comprises a depending arm 188 secured to the pivot stud 182 for movement therewith, and extending across the pin 82 in position to move the latter out of engagement with the spring arm 70 and therethrough to swing the lever 72 against the action of the spring 80 sufficiently for the pawl arm 79 to snap into the notch 75.

A shunt line 189 including a switch 190 (see Fig. 16) connecting the lines 60 and 64 across the switches 61 and 63 is provided for maintaining the motor circuit until the stub shaft 86 has completed its revolution. The switch 190 comprises two spring contact arms 191 and 192 mounted on a bracket 193 on the frame plate 27. The contact arm 191 (see Fig. 4) is in engagement with one end of a lever 194 pivotally mounted intermediate ends on the bracket 193. The other end of the lever 194 is provided with a finger 195 disposed in the path of a peripheral cam 196 on the hub of the gear 94. The cam 196 extends through slightly less than 360°, the ends defining a space 197 in which the finger 195 is disposed when the shaft 86 is in its idle position. The lead end of the cam 196 is beveled as indicated at 198, and is located to move immediately into engagement with the finger 195 to close the switch 190 upon initiating rotation of the shaft 86 and before the record is ejected from the turntable 20. At the end of one complete revolution of the shaft 86, the finger 195 will snap into the space 197, thereby opening the switch. If a new record has been positioned on the turntable 20, the switch 63 will again be closed, and the operation of the machine will continue. However, if the last record has been played, the switch 63 will remain open, and hence opening of the switch 190 will break the motor circuit to stop the machine.

The means for transferring records selectively from the magazine 25 onto the turntable 20 is driven from the shaft 86, and in its preferred form comprises a link 199 pivoted at one end to the eccentric pin 163. The other end of the link 199 is pivotally connected to one end of a lever 200 pivoted intermediate its ends on an upstanding post 201 on the frame plate 27. A rod 202 serves to pivotally connect the other end of the lever 200 to one end of a lever 203 pivotally mounted intermediate its ends on the underside of the wall 37 of the magazine 25. The other end of the lever 203 is pivotally connected through a link 204 to a feeding device of suitable construction.

In the present instance, the feeding device (see Figs. 1, 7, 8, 9 and 12) comprises an elongated slide 205 to which the link 204 is connected. The ends of the slide 205 are struck up and are slidably mounted on a pair of parallel guide rods 206 extending parallel to the underside of the record supporting plate 37 and diametrically of the turntable 20. The rods 206 are secured at their ends in depending end flanges 207 on a supporting plate 208 rigidly secured to the underside of the plate 37.

Mounted on the slide 205 is an inverted U-shaped bracket 209 the top wall of which is formed on its inner end with an upwardly curved tongue 210 movable in elongated registering slots 211 formed in the wall 37 and the plate 208, and extending diametrically of the discharge opening 38. An opening 212 is formed in the side wall 39 of the magazine 25 to permit movement of the tongue 210 along the slots 211 out of the magazine 25. The free end of the tongue 210 is formed with a reverse curve so as to constitute a stop for a lever 213 pivoted at its outermost end in the bracket 209. A coiled tension spring 214 connected at its ends to the bracket 209 and a lug 215 on the lever 213 tends to swing the latter upwardly against the stop 210.

The lever 213 extends out of the bracket 209 substantially along the slide 205, and is formed along one side with a depending side flange 216. Pivotally mounted in the free end of the lever 213 is a dog 217 having a heel 218 underlying the end of the lever, and an upwardly extending selector tooth 219 adapted upon reciprocation of the slide 205 to engage the outer edge of the lowermost record of the stack in the magazine 25 and to feed the record downwardly into position over the turntable 20. A coiled tension spring 220 connected at its ends to the dog 217 and the side flange 216 tends to hold the heel 218 against the underside of the lever 213.

A slide 221 is mounted on the underside of the lever 213 for movement along the flange 216 and extends beyond the free end thereof. The slide 221 is formed with a longitudinal slot 222 slidable on a headed pin 223 depending from the lever 213. A coiled tension spring 224 connected at its ends to the pin 223 and a depending lug 225 on the left end of the slide 221 tends to urge the latter to the right beyond the dog 217 into position to engage the underside of the record during the feeding operation.

When the slide 205 is in its outermost inoperative position, the free end of the slide 221 is depressed by the stack of records in the magazine into the plane of the wall 37, thus positioning the tooth 219 for selective engagement with the outer edge of the lowermost record. Upon rotation of the shaft 86, the tooth 219 is advanced to the right concurrently with the outward swinging movement of the tone arm 23. The spring 220 provides a yieldable engagement between the record and the tooth 219. A stop 226 carried by the slide 221 is movable into engagement with a fixed stop 227 on the underside of the wall 37 as the slide 205 nears the end of its feeding stroke to retract the slide 221 out of engagement with the record.

When the record has been fed into registration with the opening 38 it is released onto the turntable 20. A depending guide 228 on the right end of the slide 205 is advanced with the latter into position to cooperate with the fixed guides 45 about the turntable 20 to control the fall of the record. As soon as the record is discharged from the magazine 25, the next record in the stack takes its place and depresses the tooth 219 and the lever 221 against the action of the spring 214. The movement of the slide 205 is reversed, concurrently with the reversal of the tone arm 23, to return the tooth 219 along the bottom of the stack to initial position.

The operation will now be briefly described. Assuming that the machine is idle and that a stack of records has been placed in the magazine 25, the hand switch 61 is closed. Then the button 139 is depressed to close the switch 63 and the switch 134, thereby establishing circuits for the motor 54 and the solenoid 106. Excitation of the solenoid 106 causes the clutch 87 to close, thereby instituting rotation of the stub shaft 86.

Immediately upon rotation of the stub shaft 86 out of its idle position, the disk 107 locks the lever 100 for opening the clutch 87 in inoperative position, and the cam 196 closes the switch 190 to maintain the motor circuit. The cam 145 elevates the stylus 24, and the eccentric pin 163 causes the tone arm 23 to swing outwardly beyond the turntable 20.

Simultaneously, the eccentric pin 163 causes the lowermost record to be fed into registration with the opening 38 whereupon it drops onto the turntable. The record depresses the plunger 84 to close the switch 63 and thereby to establish the motor circuit during the playing of the record. After the record is positioned on the turntable 20, the feeding means is returned to inoperative position, and simultaneously the tone arm 23 is swung inwardly into position over the initial starting point, the cam extension 170 acting to release the tone arm at this point. The stylus 24 then is lowered into engagement with the record groove. Shortly after the completion of the foregoing cycle of operations, the shaft 86 completes one revolution whereupon the switch 190 is opened, and the lever 100 is released to open the clutch 87, thereby stopping the shaft in its initial position.

The stylus 24 follows the course of the record groove to play the record, and causes the tone arm 23 to swing inwardly toward the center of the record. When the stylus 24 has traversed the full extent of the record groove, the switch 111 is closed automatically, either through engagement of the lever 112 against the stop 129 to close the contacts 115 and 122, or through a reverse movement of the tone arm 23 resulting from an eccentric groove in the record to close the contacts 116 and 123, to establish the circuit for the solenoid 106. If it is desired to reject the record before it is played or any time during the playing, the button 139 is actuated to close the switch 134 which will also close the circuit for the solenoid 106.

Excitation of the solenoid 106, through closing of either of the switches 111 and 134, serves to reinstitute the foregoing cycle of operations. In the course of this cycle of operations, the cam the abutment 176 elevates the friction roller 185 to discharge the record on the turntable before the next record is positioned thereon.

The operation is automatically repeated until all of the records in the stack have been played. When the last record has been discharged from the turntable 20, the switch 63 remains open. As soon as the shaft 86 completes its final revolution, the switch 190 is opened, and the machine comes to rest.

I claim as my invention:—

1. In a phonograph, in combination, a turntable, a tone arm movable inwardly over said turntable and outwardly beyond said turntable, a pickup pivotally mounted for vertical movement on the free end of said arm, a lever pivotally mounted intermediate its ends on the underside of said arm, the outer end of said lever having a rest engaging the underside of said pickup, an arm movable with said tone arm, a lever pivotally mounted intermediate its ends in said last mentioned arm, a link connecting the inner ends of said levers, a cam lever having an arcuate lifting sector underlying the outer end of said last mentioned lever in all positions of said tone arm, and cam means for actuating said cam lever.

2. In a phonograph, in combination, a turntable, a tone arm movable over the top of said turntable, a pickup pivotally mounted for vertical movement on the free end of said arm, a lever pivotally mounted on the underside of said arm, one end of said lever being adapted to engage the underside of said pickup, an arm movable with said tone arm, a lever pivotally mounted on said last mentioned arm, a link connecting said levers, a cam lever having a lifting surface underlying one end of said last mentioned lever in all positions of said tone arm, and means for actuating said last mentioned lever.

3. In a phonograph, in combination, a frame, a vertical spindle, a horizontal turntable on said spindle, a vertical post on said frame, a vertical sleeve pivotal on said post, a tone arm carried by said sleeve for swinging movement over and beyond said turntable, a transverse arm on said sleeve having a pin on its free end, a stub shaft, clutch means for connecting said spindle to said shaft, a crank pin driven by said shaft, a crank arm pivoted at one end to said frame and having a slot connection with said crank pin, the free end of said crank arm being adapted to engage said first mentioned pin to swing said tone arm beyond said turntable, a catch pivoted on the free end of said cam arm, spring means tending to urge said catch into position to engage said first mentioned pin, and cam means for guiding the movement of said catch to locate said catch in position to engage said first mentioned pin in the outward movement of said tone arm, and to move said catch out of engagement with said first mentioned pin upon inward movement of said tone arm into position over the initial starting point of the record groove.

4. In a phonograph, in combination, a frame, a horizontal turntable, a tone arm mounted for swinging movement over said turntable, a transverse arm movable with said tone arm, a crank, a crank lever pivoted at one end to said frame and having a slot connection with said crank, the free end of said crank lever being adapted to engage said transverse arm to swing said tone arm outwardly, a catch pivoted on the free end of said crank arm, spring means tending to urge said catch into position to engage said transverse arm, and means coacting with said catch to cause movement of said catch into position for engagement with said transverse arm upon outward movement of said tone arm, and to move said catch out of engagement with said transverse arm upon inward movement of said tone arm beyond a predetermined point.

5. In a phonograph, in combination, a turntable, a tone arm mounted to swing over said turntable, means for swinging said tone arm, an oscillatory member, means for periodically driving said member, a catch pivotally mounted on said member, a fixed abutment, a cam arm rigid with said catch and adapted to coact with said abutment, and spring means tending to move said cam arm against said abutment, movement of said cam arm along said abutment upon movement of said member in one direction serving to release said catch into interlocking engagement with said tone arm, and upon movement of said member in the other direction acting to separate said catch from said tone arm after swinging the latter into a predetermined position.

6. In a phonograph, in combination, a magazine having a bottom wall adapted to support a stack of records, said wall being formed with an elongated slot, a slide mounted on the underside of said wall for movement along said slot, a frame pivotally mounted on one end on said slide, said slide being formed with stop means for limiting the upward movement of said frame, and a selector dog mounted on said frame for movement therewith, said dog extending through said slot for engagement with the lowermost record of the stack to feed said record along said wall upon movement of said slide in one direction.

7. In a phonograph, in combination, a magazine having a bottom wall adapted to support a stack of records, said wall being formed with an elongated slot, a slide mounted on the underside of said wall for movement along said slot, a frame pivotally mounted at one end on said slide, spring means tending to pivot said frame upwardly, a selector dog pivotally mounted on said frame for movement therewith, said dog extending through said slot for engagement with the lowermost record of the stack to feed said record along said wall upon movement of said slide in one direction, and spring means tending to pivot said dog upwardly.

8. In a phonograph, in combination, a magazine having a bottom wall adapted to support a stack of records, a slide mounted for reciprocation along the underside of said wall, a selector dog mounted on said slide for engaging the lowermost record of the stack and feeding said record along said wall, a member reciprocably mounted on said slide, spring means tending to urge one end of said member beyond said dog to engage the underside of said record during the feeding movement, and stop means for automatically retracting said member to release said record upon movement of said slide beyond a predetermined position.

9. In a phonograph, in combination, a horizontal magazine adapted to contain a stack of records, said magazine comprising a floor, a U-shaped side wall conforming in part to the curvature of the records, and a straight side wall opposite said first mentioned wall, the lower edge of said straight wall being spaced above said floor by the thickness of one record, said floor being formed with an offset semi-circular opening adjacent said straight wall, and with a slot extending from said first mentioned wall centrally to said opening, a slide mounted on the underside of said magazine along said slot, a frame pivotally mounted in said slide, spring means tending to urge said frame upwardly, a pivotal selector dog mounted on said frame for engaging the lowermost record in said magazine to feed the record toward said opening, a slide mounted on the underside of said frame and extending beyond one end thereof, spring means tending to urge said last mentioned slide outwardly to underlie the record, and stop means for retracting said last mentioned slide from under the record as the latter is moved into registration with said opening.

10. In a phonograph, in combination, a magazine adapted to contain a stack of records, said magazine comprising a floor, a U-shaped side wall conforming in part to the curvature of the records, and a straight side wall opposite said first mentioned wall, the lower edge of said straight wall being spaced above said floor by the thickness of one record, said floor being formed with an offset semi-circular opening adjacent said straight wall, and with a slot extending from said first mentioned wall centrally to said opening, and means projecting through said slot for feeding the lowermost record of the stack along said slot into registration with said opening.

11. In a phonograph, in combination, a magazine adapted to contain a stack of records, said magazine comprising a floor, a U-shaped side wall conforming in part to the curvature of the records, and a straight side wall opposite said first mentioned wall, the lower edge of said straight wall being spaced above said floor by the thickness of one record, said floor being formed with an offset opening adjacent said straight wall, and means for feeding a record from the stack under said straight wall into registration with said opening.

12. In a phonograph, in combination, a frame, a vertical drive spindle mounted in said frame, a turntable mounted on said spindle, a record magazine mounted above said turntable in partially offset relation thereto and having a semicircular discharge opening in the bottom concentric with said turntable, a guide bar extending diametrically of said opening and said turntable and constituting one wall of said magazine, means for feeding a record from said magazine under said bar into registration with said opening, friction means on the lower edge of said bar for engaging the upper surface of the record during movement thereunder, and spaced guide means for directing the record from said opening centrally on said turntable.

13. In a phonograph, in combination, a horizontal turntable, a record magazine over said turntable in offset relation thereto and having an opening in the bottom in alignment with said turntable, feeding means for moving a record from said magazine into registration with said opening, a plurality of spaced vertical guides about said turntable, and a guide movable with said feeding means into position adjacent said opening, said guides serving to direct the record centrally to said turntable.

14. In a phonograph, in combination, a horizontal turntable, a record magazine over said turntable and having an opening in the bottom in vertical alignment with said turntable, feeding means for moving a record from said magazine into registration with said opening, and a guide movable with said feeding means into position adjacent said opening to direct said record centrally to said turntable.

15. In a phonograph, in combination, a horizontal turntable having a centering pin, a record magazine above said turntable, said magazine having an opening in its bottom wall directly over said turntable, means for discharging a record with a central aperture from said magazine through said opening onto said turntable, and a plurality of guide members spaced about said turntable for directing the record in its fall so as to cause the record aperture to receive said pin.

16. In a phonograph, in combination, a turntable, a record magazine mounted above said turntable and having an opening in the bottom in vertical alignment with said turntable, a guide bar, means for feeding a record from said magazine under said bar into registration with said opening, and friction means on the lower edge of said bar for engaging the upper surface of the record during movement thereunder.

17. In a phonograph, in combination, a rotatable record support, means for driving said support, means including a friction roller movable into engagement with the record to lift one side thereof from said support and means for rotating said friction roller.

18. In a phonograph, in combination, a rotatable record support, a discharge receptacle at one side of said support, and rotatively driven means for lifting one side of the record from said support, said means being located opposite the point where the tilted record is supported by the turntable.

19. In a phonograph, in combination, a drive spindle, a rotatable record support on said spindle, a discharge receptacle at one side of said support, a friction roller mounted adjacent the side of said receptacle where said support is turning away from said receptacle for movement into engagement with the underside of the record to lift one side thereof from said support, and means for rotating said roller in a direction tending to direct the record from said support toward said receptacle.

20. In a phonograph, in combination, a drive spindle, a rotatable record support mounted on said spindle, a drive disk secured to said spindle, a bearing pivotally mounted below said support, a shaft journaled in said bearing, a friction roller on one end of said shaft adapted to be elevated into engagement with the underside of the record to lift one side thereof from said support upon pivotal movement of said bearing in one direction, and a friction roller on the other end of said shaft movable into engagement with said disk upon movement of said first mentioned roller into record engaging position.

21. In a phonograph, in combination, a drive spindle, a turntable on said spindle for supporting a record, a friction roller mounted for pivotal movement into position to engage the record to lift one side thereof from said turntable, and means for rotating said roller from said spindle.

22. In a phonograph, in combination, a drive spindle, electric means for driving said spindle, said means including a circuit control switch, a turntable on said spindle for supporting a record, a pivotal support, a friction roller mounted on said support for movement into engagement with the record to eject the latter, means driven from said spindle for automatically elevating said roller into record engaging position, and means movable with said support automatically operable to open said switch when said roller is elevated into record engaging position.

23. In a phonograph, in combination, a drive spindle, a rotatable record support mounted on said spindle, and means for ejecting a record from said support, said means including a friction roller mounted for movement into engagement with the underside of the record to lift one side thereof from said support, and means for rotating said roller in a direction opposite to that of the record at the point of engagement.

24. In a phonograph, in combination, a rotatable record support, drive means for said support, a drive disk secured to said spindle, a bearing pivotally mounted below said means, a shaft journaled in said bearing, a friction roller on one end of said shaft adapted to be elevated into engagement with the underside of the record to lift one side thereof from said support upon pivotal movement of said bearing in one direction, a friction roller on the other end of said shaft movable into engagement with said disk upon movement of said first mentioned roller into record engaging position, cam actuated means for pivoting said bearing, and automatic means for periodically actuating said cam actuated means.

25. In a phonograph, in combination, a turntable for supporting a record, electric means for driving said turntable, said means including a circuit control switch, a support, a friction roller mounted on said support for movement into engagement with the record to eject the latter, means driven from said electric means for automatically moving said roller into record engaging position, and means automatically operable to open said switch upon movement of said roller into record engaging position.

26. In a phonograph, in combination, a frame, a base lever movable on said frame, a second lever pivotal on said base lever, spaced contacts carried by said base lever, spaced contacts carried by said second lever, said last mentioned contacts being mounted between said first mentioned contacts for selective engagement with the latter upon movement of said second lever in opposite directions on said base lever, spring means resisting movement of said second lever out of neutral in one direction, an arm pivotal on said frame and embracing said second lever, and spring means tending to swing said arm in said one direction.

27. In a phonograph, in combination, a pivotal base lever, a second lever pivotal over said base lever, spaced contacts carried by said base lever, spaced contacts carried by said second lever, said contacts being arranged for selective engagement upon relative movement of said levers in opposite directions, spring means resisting relative movement of said levers out of neutral in one direction, and means embracing one of said levers for relatively pivoting said levers in either direction.

28. In a phonograph, in combination, a horizontal frame plate, a vertical spindle journaled in said plate, means mounted on the underside of said plate for driving said spindle, a turntable mounted on said spindle, a magazine adapted to contain a stack of records mounted on said plate, said magazine being located over and partially beyond one side of said turntable and having an offset discharge opening in the bottom concentric with said turntable, a discharge receptacle located below and at one side of said turntable and directly under said magazine, means for periodically feeding the lowermost record of the stack to the opening, and means for discharging the record from said turntable into said receptacle.

29. In a phonograph, in combination, a vertical drive spindle, an electric power supply means therefor, a record supporting turntable mounted on said spindle, a switch in circuit with said power supply, and means for closing said switch, said means including an actuator mounted at one side of said turntable for engagement by the underside of a record to close said switch when the record is positioned on said turntable.

30. In a phonograph, in combination, a vertical drive spindle, an electric power supply means therefor, a record supporting turntable mounted on said spindle, said turntable being smaller in diameter than the record, means for driving said spindle, said means including a circuit control switch in circuit with said power supply, trip means for closing said switch, and a vertical plunger for releasing said trip means to close said switch, said plunger being mounted at one side of said turntable in position to be depressed through engagement with the underside of the record.

31. In a phonograph, in combination, a vertical drive spindle, an electric power supply means therefor, a turntable mounted on said spindle and adapted to support a record, driving means for said spindle, said means including a circuit control switch in circuit with said power supply and normally tending to open, a lever movable into and out of position to close said switch, a latch for holding said lever out of engagement with said switch, spring means connecting said lever and said latch and tending to rotate said lever into engagement with said switch and to hold said latch in interlocking engagement with said lever, a vertically reciprocable plunger operatively connected to said latch and positioned for depression through engagement by the underside of the record to trip said lever, and means for moving said lever out of engagement with said switch into interlocking engagement with said latch when the record is removed from said turntable.

32. In a phonograph, in combination, a record supporting turntable, drive means for said turntable, electric power supply means connected thereto, said means including two parallel circuit control switches connected to said power supply means, means for closing one of said switches when a record is positioned on said turntable, discharge means for ejecting the record from said turntable, means operable from said discharge means to open said one switch upon ejection of the record from said turntable, and means for closing the other of said switches during the operation of said discharge means.

33. In a phonograph, in combination, a drive spindle, an electric power supply means therefor, a turntable mounted on said spindle and adapted to support a record, driving means for said spindle, said means including a circuit control switch connected to said power supply and normally tending to open, a member movable to close said switch, trip means for holding said member out of engagement with said switch, an actuator positioned for engagement by the underside of the record when positioned on the turntable to release said trip means to close said switch, and means for resetting said trip means when the record is discharged from said turntable.

34. In a phonograph, in combination, a turntable for supporting a record, means for discharging the record from said turntable, drive means for said turntable and the discharge means, said drive means including a switch, means for closing said switch upon positioning the record on said turntable and for opening said switch upon discharging the record from said turntable, and manual means for closing said switch.

35. In a phonograph, in combination, a turntable for a record to be played, drive means for said turntable, a tone arm mounted to swing over said turntable, a pickup carried by said arm, means for swinging said tone arm inwardly over said turntable and outwardly beyond said turntable, means including a clutch for connecting said drive means to said first mentioned means, electric means for closing said clutch, a circuit for said electric means, said circuit including a hand operable switch and an automatic switch in parallel, means connecting said automatic switch to said tone arm, said automatic switch being responsive to the movements of said tone arm to close upon movement of said tone arm into its innermost position or upon movement of said tone arm outwardly, a record operated switch for opening said circuit when a record is not on the turntable, a hand switch and means under control of said hand switch for operating said record operated switch whether a record is on the turntable or not.

36. In a phonograph, in combination, a turntable for a record to be played, drive means for said turntable, a tone arm mounted to swing over said turntable, a pickup carried by said arm, means for swinging said tone arm inwardly over said turntable and outwardly beyond said turntable, means including a clutch for connecting said drive means to said first mentioned means, means including a solenoid for closing said clutch, and a circuit for said solenoid, said circuit including a switch mechanically connected to said tone arm and responsive to the movements of said tone arm to close upon movement of said tone arm into its innermost position, a record operated switch for opening said circuit when a record is not on the turntable, a hand switch and means under control of said hand switch for operating said record operated switch whether a record is on the turntable or not.

37. In a phonograph, in combination, a turntable, drive means for said turntable, a control circuit including a switch for said drive means, means for closing said switch when a record is positioned on said turntable and for opening said switch when the record is removed, a switch parallel to said first mentioned switch, a shaft, means operable by said shaft to close said last mentioned switch, means including a clutch for connecting said drive means to said shaft, electromagnetic means for closing said clutch, a control circuit for said electromagnetic means including said first mentioned switch and a third switch in series, and manual means for simultaneously closing said first mentioned switch and said third switch.

38. In a phonograph, in combination, a turntable, a tone arm movable over said turntable, drive means for said turntable, a control circuit including a switch for said drive means, means for closing said switch when a record is positioned on said turntable and for opening said switch when the record is removed, a shaft for moving said tone arm clear of said turntable, means including a clutch for connecting said drive means to said shaft, electromagnetic means for closing said clutch, a control circuit for said electromagnetic means including said first mentioned switch and a second switch in series, and means for automatically closing said second switch upon movement of said tone arm inwardly beyond a predetermined position over said turntable.

39. In a phonograph, in combination, a spindle, a turntable on said spindle for a record to be played, drive means including an electric control circuit for said spindle, a switch in said circuit, means operable to close said switch when the record is on said turntable and to open said switch when the record is ejected, a shaft, a record ejecting device operable by said shaft, means including a clutch for connecting said drive means to said shaft to drive the latter through a predetermined degree of revolution, a switch in parallel to said first mentioned switch, and means operable by said shaft to close said last mentioned switch while said shaft is rotating.

40. In a phonograph, in combination, a spindle, a clutch element keyed to said spindle, a gear journaled on said spindle, a clutch element carried by said gear and movable into and out of position for engagement by said first mentioned clutch element, spring means tending to urge said clutch elements into coacting engagement, a shaft operatively connected to said gear, a lever having a detent movable into and out of the path of said last mentioned clutch element, spring means tending to move said detent into said path to separate said clutch elements, a solenoid for retracting said detent out of said path, an arm on said lever, and a cam disk on said shaft having a notch to receive said lever, said disk serving to hold said detent out of said path for one complete revolution of said shaft upon movement of said notch out of engagement with said lever.

41. In a phonograph, in combination, a turntable, a plurality of units including a feeding device for feeding a record onto the turntable, a tone arm movable laterally of said turntable, a pickup carried by said tone arm, and a record ejecting device, means including a shaft for driving said units in timed relation to elevate said pickup from a record on said turntable, to swing said tone arm beyond said turntable, to eject said record, to position another record on said turntable, and to bring said pickup into initial playing position, drive means for said turntable, means including a clutch for connecting said drive means to said shaft, a spring-pressed detent normally holding said clutch in open position, a solenoid for retracting said detent to cause said clutch to close, and means controlled by said shaft for holding said detent in retracted position for a predetermined degree of revolution of said shaft.

42. In a phonograph, in combination, a spindle, a clutch element keyed to said spindle, a second clutch element movable into and out of position for engagement by said first mentioned clutch element, spring means tending to urge said clutch elements into coacting engagement, a shaft operatively connected to said second clutch element, a detent movable into and out of the path of said second element, spring means tending to move said detent into said path to separate said clutch elements, a solenoid for retracting said detent out of said path, and means driven by said shaft for holding said detent out of said path for a predetermined degree of revolution of said shaft.

43. In a phonograph, in combination, a turntable, record changing means, drive means for said turntable, a shaft for periodically driving said record changing means, means including a clutch for connecting said drive means to said shaft, means including a solenoid operable to close said clutch for a predetermined degree of revolution of said shaft, and means operable at will or automatically when a record is played for energizing said solenoid, a record operated switch for opening said circuit when a record is not on the turntable, a hand switch and means under control of said hand switch for operating said record operated switch whether a record is on the turntable or not.

MARTIN NYSTROM.